US008729495B2

(12) United States Patent
Hau et al.

(10) Patent No.: US 8,729,495 B2
(45) Date of Patent: May 20, 2014

(54) METHODS AND APPARATUS FOR DETECTING NEUTRAL CHEMICAL UNITS VIA NANOSTRUCTURES

(75) Inventors: Lene V. Hau, Cambridge, MA (US); Jene A. Golovchenko, Lexington, MA (US); Anne Goodsell, Arlington, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 13/636,935

(22) PCT Filed: Mar. 24, 2011

(86) PCT No.: PCT/US2011/029818
§ 371 (c)(1),
(2), (4) Date: Dec. 3, 2012

(87) PCT Pub. No.: WO2011/119849
PCT Pub. Date: Sep. 29, 2011

(65) Prior Publication Data

US 2013/0105686 A1 May 2, 2013

Related U.S. Application Data

(60) Provisional application No. 61/317,016, filed on Mar. 24, 2010.

(51) Int. Cl.
*H01J 27/02* (2006.01)

(52) U.S. Cl.
USPC .................... 250/423 F; 250/423 R; 250/424

(58) Field of Classification Search
USPC .................................. 250/423 R, 424, 423 F
See application file for complete search history.

(56) References Cited

U.S. PATENT DOCUMENTS

2003/0094898 A1* 5/2003 Lewis .......................... 313/531
2003/0122085 A1* 7/2003 Stengl et al. ............... 250/423 F
2005/0269559 A1* 12/2005 Zhou et al. ...................... 257/10

(Continued)

OTHER PUBLICATIONS

Anne Goodsell, Trygve Ristroph, J.A. Golovchenko, and Lene Vestergaard Hau, "Field ionization of cold atoms near the wall of a single carbon nanotube," Physical Review Letters 104, 133002 (Mar. 31, 2010).

(Continued)

*Primary Examiner* — Michael Logie
(74) *Attorney, Agent, or Firm* — Foley & Lardner LLP; James F. Ewing; Cliff Z. Liu

(57) ABSTRACT

Suspended nanotubes are used to capture and ionize neutral chemical units, such as individual atoms, molecules, and condensates, with excellent efficiency and sensitivity. Applying a voltage to the nanotube(s) (with respect to a grounding surface) creates an attractive potential between a polarizable neutral chemical unit and the nanotube that varies as 1/r2, where r is the unit's distance from the nanotube. An atom approaching the nanotube with a sub-threshold angular momentum is captured by the potential and eventually spirals towards the nanotube. The atom ionizes as in comes into close proximity with a sidewall of the nanotube, creating an ion whose polarity matches the polarity of the electric potential of the nanotube. Repulsive forces eject the ion, which can be detected more easily than a neutral chemical unit. Suspended nanotubes can be used to detect small numbers of neutral chemical units (e.g., single atoms) for applications in sensing and interferometry.

58 Claims, 10 Drawing Sheets

(56) References Cited

U.S. PATENT DOCUMENTS

| | | | | |
|---|---|---|---|---|
| 2006/0138316 | A1* | 6/2006 | Seydoux et al. | 250/282 |
| 2006/0280524 | A1* | 12/2006 | Hays et al. | 399/168 |
| 2007/0283631 | A1 | 12/2007 | Grandin et al. | |
| 2007/0284631 | A1* | 12/2007 | Hsu et al. | 257/288 |
| 2008/0138087 | A1* | 6/2008 | Snyder | 398/182 |
| 2008/0266574 | A1* | 10/2008 | Groot et al. | 356/511 |
| 2008/0296483 | A1* | 12/2008 | McClelland et al. | 250/251 |
| 2009/0179161 | A1 | 7/2009 | Ward et al. | |
| 2009/0200485 | A1* | 8/2009 | Kolodney et al. | 250/424 |
| 2009/0303654 | A1* | 12/2009 | Fan et al. | 361/229 |
| 2010/0012827 | A1 | 1/2010 | Vestergaard Hau | |

OTHER PUBLICATIONS

International Search Report mailed on Jun. 17, 2011 in PCT/US2011/29818.

S. R. Segal, "Progress towards an ultracold atomic sagnac gyroscope," Ph.D. Thesis, University of Colorado, 2010.

* cited by examiner

METHODS AND APPARATUS FOR DETECTING NEUTRAL CHEMICAL UNITS VIA NANOSTRUCTURES

CROSS-REFERENCE TO RELATED PATENT APPLICATIONS

This application is a national stage application under 35 U.S.C. §371 of PCT/US2011/099818, filed on Mar. 24, 2011, which claims priority from U.S. Provisional Application 61/317,016, filed Mar. 24, 2010, which implications are hereby incorporated herein by reference in their entireties.

STATEMENT AS TO FEDERALLY SPONSORED RESEARCH

This invention was made with government support under FA9550-05-1-0331 awarded by the U.S. Air Force Office of Scientific Research and PHY-0757427 awarded by the National Science Foundation. The government has certain rights in the invention.

BACKGROUND

The ability to create high electric fields near charged carbon nanotubes has stimulated the development of nanotube-based electron field emission sources for a variety of applications, including low-power video displays, atom sensing, and atom interferometry. For example, nanotube-based electron field emission sources could be used in low power video displays and in sensitive gas sensors whose ionization currents depend on the gas pressure and species present in the gas. Typical nanotube-based devices include an array, or forest, of nanotubes or nanowires that extend longitudinally from a substrate. The quantitative behavior of such devices depends on the fact that the large fields used in operation can be obtained at the tips of nanotubes or nanowires in an inhomogeneous forest of nanotubes or nanowires.

Due to shielding effects, active nanotubes in a forest are generally separated from each other by many inactive nanotubes. The effective active area of a forest-based device is thus often a small fraction of the area occupied by the forest. For instance, a forest of nanowires extending over a 1 cm×2 cm area typically includes $10^{10}$ nanowires, of which only about 1000 are active in tip ionization. The resulting efficiency of the forest is about $10^{-7}$. Furthermore, interpretation of the behavior of forest-based devices is complicated by variability of nanotube lengths, density, and tip geometry, including tip geometry that changes with time, among the nanowires in the forest. As a result, devices based on nanowire forests are often unsuitable for reliable, sensitive atom detection or atom interferometry.

SUMMARY

Embodiments of the inventive subject matter include charged, substantially one-dimensional nanostructures that can be used to convert hard-to-detect neutral chemical units (e.g., atoms, molecules, and condensates) into charged particles (e.g., cations and anions) that are relatively easy to detect. Exemplary methods and apparatus disclosed herein facilitate ionization of one or more single atoms with high efficiency, making it possible to detect appreciably small concentrations of neutral chemical units in gases and other fluids with significantly high sensitivities. Exemplary nanostructures also can be used for detecting fringe patterns generated by interfering matter waves with sufficient spatial resolution to implement highly sensitive atom interferometers, gyroscopes, graviometers, and gravity gradiometers.

Inventive nanotube-based apparatus can be used to practice methods of ionizing neutral chemical units as follows. Applying a charging voltage, which may be about 200 V, about 300 V, or more, from a voltage source between a substantially one-dimensional nanostructure and a reference potential creates an electric field in a vicinity of the nanostructure. When ionizing rubidium atoms, the electric field may be about 3 V/nm or larger; for non-alkali atoms, the field may be larger (e.g., 20 V/nm). This electric field captures a neutral chemical unit and attracts the neutral chemical unit towards a position along a length of the nanostructure. Eventually, the neutral chemical unit gets close enough to the position along the length of nanostructure to ionize; ionization transforms the neutral chemical unit into a charged chemical unit whose polarity measures the polarity of the electric field. Like-like repulsion ejects the charged chemical unit from the vicinity of the nanostructure.

The charged chemical unit can be detected with an ion detector, such as a channel-electron multiplier (CEM), a position-sensitive microchannel plate, a mass spectrometer, an energy spectrometer, and ion time-stamping equipment. In some cases, ions optics or another suitable device may "magnify" ion-based image of the nanostructure sensed by the detector. Alternatively, the nanostructure can be curved away from the source of the neutral chemical unit such that charged chemical units ejected from the vicinity of the nanostructure travel along diverging, rather than parallel, propagation vectors away from the nanostructure. This also has the effect of "magnifying" any detected image, although the detected image may be affected by pincushion-type distortion, which can be compensated based on the nanostructure's radius of curvature.

Some embodiments include position-sensitive detectors (with or without ion magnifiers) capable of determining the position along the length of the nanostructure at which the charged chemical unit was generated. These embodiments may determine the position with a resolution of about 1 nm or less. They may also detect a circumferential position of the nanostructure at which the charged chemical unit was generated, e.g., with a resolution of about 1 nm or less.

In some cases, the voltage source varies the charging voltage applied to the nanostructure as a function of time or to account for variations in angular momentum (e.g., due to changes in temperature) of incident neutral chemical units. For instance, the charging voltage may be increased in a linear or stepwise fashion (e.g., along rungs of a quantum ladder) to selectively ionize incident neutral chemical units as a function of their ionization energies, masses, and polarizabilities. Such variation can also be used to produce indications of the presence (or absence) of particular types of neutral chemical units as by scanning the charging voltage across a range corresponding to different ionization thresholds.

Alternatively, nanostructures can be arranged in an array to perform parallel detection of different types of neutral chemical units. Such detection can be performed with an array of identical nanostructures charged to different voltages, an array of different nanostructures charged to the same voltages, or combinations of different nanostructures charged to different voltages, depending on the application. Nanostructure arrays are particularly useful for discriminating among neutral chemical units in a fluid flowing within the capture range of the charged array.

Exemplary substantially one-dimensional nanostructures can have be at least about ten times longer than they are wide (i.e., their lengths are at least ten times greater than their diameters). They can include or be formed of any of a single-walled carbon nanotube, a multi-walled carbon nanotube, a nanowire, a nanorod, a nanocylinder, a strip of a sheet of graphene, and an edge of a sheet of graphene. Example nanostructures can be fabricated using any suitable technique, including those found in U.S. application Ser. No. 12/449,141 entitled "Methods, Systems, and Apparatus for Storage, Transfer and/or Control of Information via Matter Wave Dynamics," filed on Sep. 11, 2009, by Lene V. Hau and in International Publication No. WO 2005/000739 A1, published Jan. 6, 2009, entitled "Carbon Nanotube Device Fabrication," each of which is incorporated herein in by reference in its entirety.

In some embodiments, at least a portion of the nanostructure can be suspended over a gap in a substrate, with a first electrode disposed on a substrate with a first end of the nanostructure. The width of the first electrode can be less than about two times the length of the nanostructure. Such embodiments may also include a supplemental voltage source configured to apply a supplemental voltage between the first end of the nanostructure and a second end of the nanostructure.

Yet further embodiments include a source of neutral chemical units, such as a magneto-optical trap, a cold atom source, a thermal vapor, or a thermal beam. Neutral chemical units can be directed from the source toward the nanostructure with an appropriately manipulated potential or flow. For example, the neutral chemical units may be directed toward the nanostructure after release from a magneto-optical trap or by flowing a gas including the neutral chemical units past the nanostructure. The source may also release a plurality of neutral chemical units (either at once or sequentially), and a detector may detect a number of ions leaving the nanostructure as a function of the charging voltage applied to the nanostructure. An optional probe laser may illuminate neutral chemical units released from the source before ionization.

Exemplary apparatus may also include a laser or electron beam source that excites the neutral chemical unit to an excited state before the neutral chemical unit is captured by the electric field and/or ionization.

Additional inventive embodiments include atom interferometers and corresponding methods of converting a matter-wave interference patterns to ionized fringe patterns. Neutral chemical units propagate about and interfere at the end of the a beam path to generate a matter-wave interference pattern in the vicinity of a substantially one-dimensional nanostructure. A voltage source generates an electric field about the nanostructure by applying a charging voltage between the nanostructure and a reference potential so as to capture the matter-wave interference pattern in the electric field. The captured matter-wave interference pattern ionizes along a length of the substantially one-dimensional nanostructure to generate the ionized fringe pattern along the length of the nanostructure.

Detecting the ionized fringe pattern with a position-sensitive ion detector yields a measurement of the ionized fringe pattern's period and/or fringe position(s). (The ionized fringe pattern may also be magnified before detection with ion optics or by using a curved nanostructure.) The measured period and/or shift can be used to determine an angular orientation of the nanostructure, a velocity (linear, angular, or both) of the nanostructure, a force applied to the nanostructure, and a potential applied to the nanostructure. Information about the fringe pattern can also be used to determine changes in orientation, velocity, force, and potential.

The capture and ionization processes can be carried out for single atoms or molecules interacting with a single, charged nanotube, nanowire, or other one-dimensional nanostructure.

High cross sections for sidewall ionization by a single nanotube or nanowire can be obtained, even for relatively modest voltages applied to the nanotube. For instance, a cross section for sidewall ionization of cold atoms can be achieved that is five times higher than the cross section for tip ionization of cold atoms. Similarly, the cross section for sidewall ionization of thermal atoms is three times higher than the cross section for tip ionization of thermal atoms. In general, using sidewall ionization, a single nanotube can achieve a capture cross section comparable to that achieved by a macroscopically sized forest of nanotubes or nanowires with tip ionization.

The large critical impact parameter for atom capture perpendicular to the length of the nanotube can be used to capture atoms or molecules even at large distances from the nanotube. This wide capture range gives rise to a high signal-to-noise ratio and high sensitivity.

Sidewall ionization can be applied to form a compact, chip-integrated neutral atom or molecule detector with single atom or molecule sensitivity even for ground state atoms or molecules. Time resolution in the nanosecond regime can be achieved; the spatial resolution is determined by the capture cross-section of the nanotube in the transverse direction and can be at the nanometer level with use of time discrimination. The threshold voltage for ionization is a sensitive probe of the species being ionized. With the appropriate sample geometry and the use of ion optics, the detector's efficiency for atom or molecule counting can approach 100%. Such a detector has applications in sensitive gas detection; the development of compact, cold-atom based interferometers, interferometers based on thermal (non-cooled) atoms, and atom counting and/or quantum correlation measurements in cold and in thermal atomic gases.

With a position-sensitive microchannel plate and ion optics, spatial resolution at the single nanometer or sub-nanometer level can be obtained along the length of the nanotube. Combined with the large atom capture range perpendicular to the nanotube, fringes of interfering matter waves can be measured directly and with high sensitivity, for example in a compact chip-based atom interferometer.

Additionally, quantum degenerate gases can be manipulated into extreme conditions.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference.

BRIEF DESCRIPTION OF THE DRAWINGS

The skilled artisan will understand that the figures, described herein, are for illustration purposes only, and that the drawings are not intended to limit the scope of the disclosed teachings in any way. In some instances, various aspects or features may be shown exaggerated or enlarged to facilitate an understanding of the inventive concepts disclosed herein (the drawings are not necessarily to scale, emphasis instead being placed upon illustrating the principles of the teachings). In the drawings, like reference characters generally refer to like features, functionally similar and/or structurally similar elements throughout the various figures.

DETAILED DESCRIPTION

Following below are more detailed descriptions of various concepts related to, and embodiments of, inventive systems, methods and apparatus for detecting neutral chemical units via nanostructures. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Overview

Figure 1A:
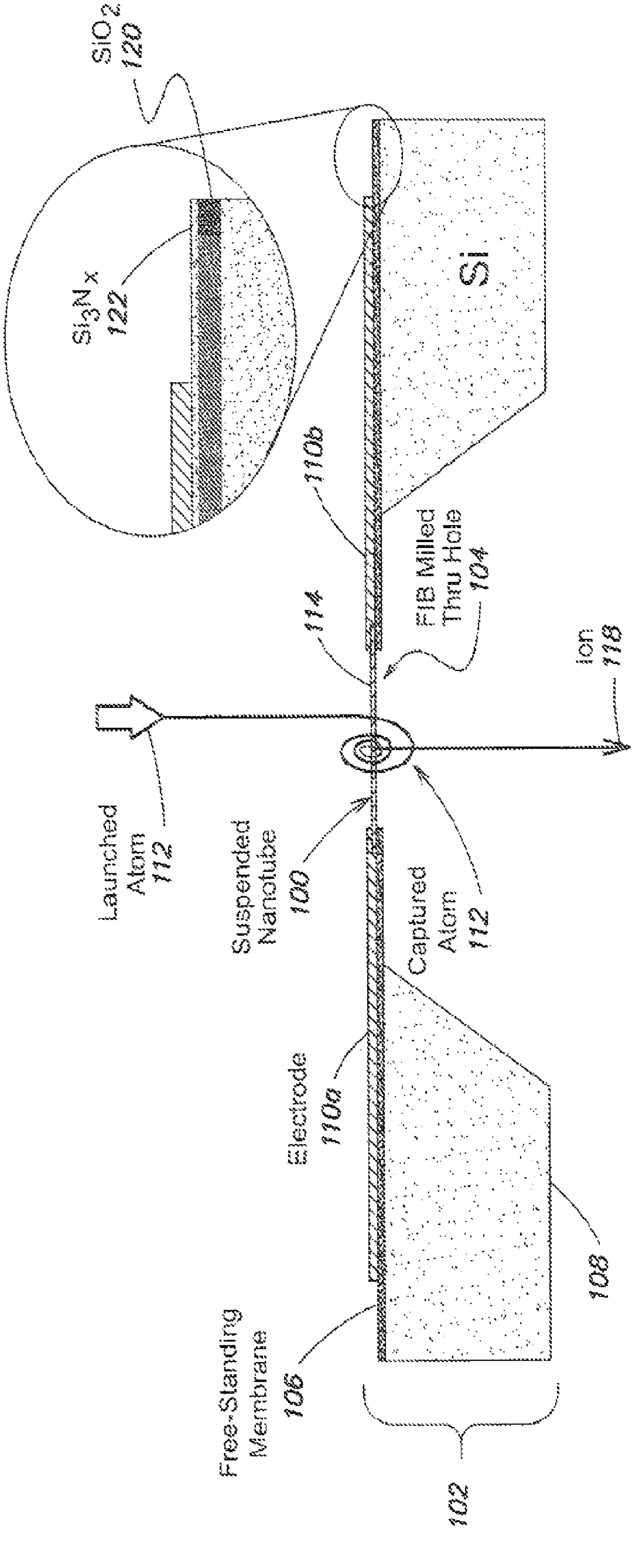
FIG. 1A is a schematic diagram of a sample including a suspended carbon nanotube.
Figure 1B:
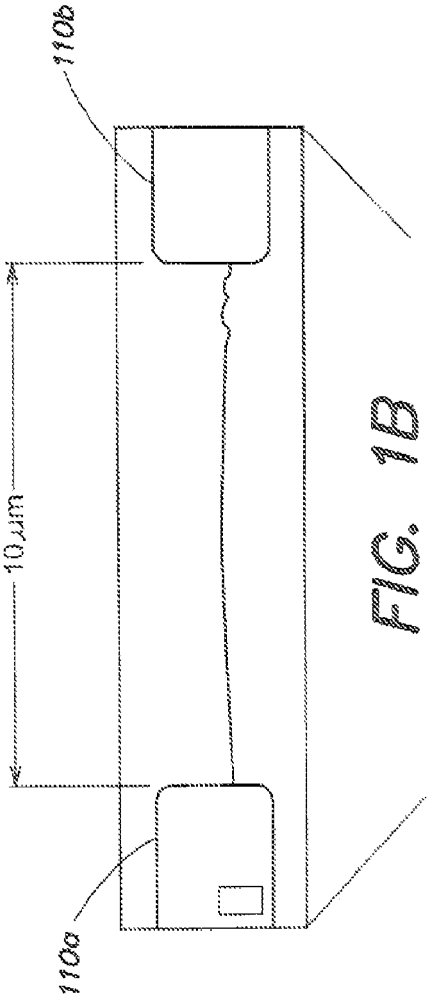
FIGS. 1B and 1C are scanning electron microscopy (SEM) images of a sample including a suspended carbon nanotube.
Figure 1C:
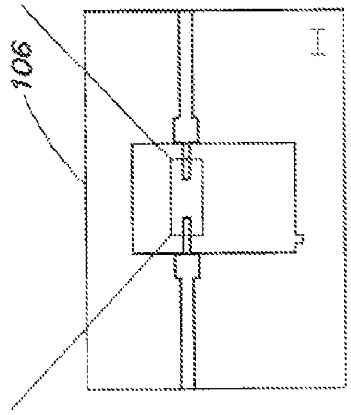

Referring to FIGS. 1A-1C, a sample 102 includes a single-walled carbon nanotube 100 having a diameter of a few nanometers and a length of about 10 μm. Nanotube 100 is suspended across a gap 104 formed in an insulating silicon nitride membrane 106 on a top surface of a grounded silicon substrate 108. The ends of nanotube 100 contact metallic electrodes 110*a*, 110*b*. Voltages in excess of 300 V can be applied to nanotube 100 (i.e., between nanotube 100 and grounded silicon substrate 108 or a grounded reference electrode) without inducing electrical breakdown of the grounded silicon substrate 108 and without damaging the nanotube. In some embodiments, only one end of nanotube 100 is in contact with an electrode. The scale bar in the scanning electron microscopy (SEM) images of FIGS. 1B and 1C is 10 μm.

Applying a uniform positive or negative voltage to nanotube 100 charges the nanotube and generates an electric field in the vicinity of the nanotube. Because of the small radius and extended length of nanotube 100, even modest voltages (e.g., less than 300 V) generate a relatively high electric field (e.g., up to about 20 Volts per nanometer near the surface of the nanotube, or until the field evaporation limit is reached). A neutral atom or molecule 112 incident within the capture range is captured by the electric field generated by the charged nanotube. The capture range, which is the distance from the nanotube within which an atom will be captured with 100% certainty, relates to the applied voltage and the temperature of the atoms and is discussed in greater detail below. The captured atom or molecule is then incident on a sidewall 114 of nanotube 100 and ionized by the electric field from the charged nanotube, resulting in the release of a charged ion 118. The high electric field in the vicinity of nanotube 100 captures and ionizes the incident atoms or molecules 112 with high efficiency, allowing large ionization cross sections to be achieved.

In some embodiments, a voltage is also applied across nanotube 100 between electrodes 110*a* and 110*b*. The voltage gradient between the electrodes induces a current across the nanotube, heating the nanotube. The heat can be used to clean residue or other contamination from the nanotube. Heating nanotube 100 may also be used for thermally assisted ionization of the incident atoms or molecules.

The nanotube 100 shown in FIGS. 1A-1B can be used to detect small quantities of neutral atoms or molecules in a matter stream or gas, such as air, flowing in the direction of the launched atom 112. The gas may also just be in the environs of the nanotube without a particular flow direction. As the gas flows past the nanotube 100, atoms and molecules whose angular momentum is below a critical threshold get captured by the tube and assume spiraling and/or collision trajectories towards the nanotube 100. As described in greater detail below, the critical angular momentum depends on the voltage on the nanotube 100, the incident atom or molecule's DC polarizability and mass, and weakly on the radius of the nanotube 100. Close to the nanotube, the captured neutral species is converted to an ion when the voltage of the tube is above a certain threshold voltage whose value depends on the ionization potential of the species and on the radius of the nanotube. By changing the voltage and/or radius of the nanotube 100, the nanotube 100 can be used to capture and ionize only those atoms or molecules whose DC polarizability is above a given threshold, and/or whose ionization potential and/or mass is below a certain threshold value. As a result, the nanotube 100 can be used to discriminate among neutral chemical units in the gas.

The nanotube 100 can also be used to detect different types of neutral chemical units in serial, in parallel, or both. In serial detection, the voltage applied to the nanotube 100 is varied as a function of time (e.g., increased in a linear, chirped, or stepwise fashion, as in the quantum ladder described below). As the voltage changes, the nanotube 100 captures and ionizes different species of atoms and molecules in the flowing gas. Mapping the ion detection to the voltage applied to the nanotube 100 yields an indication of the captured and ionized atom or molecule's ionization potential, mass, and/or polarizability, which can be used to identify the ionized atom or molecule.

Alternatively, the gas or matter stream can be flowed over or through an array of nanotubes, each of which has a different radius and/or is charged to a different potential. (FIG. 7 shows a minimal array of two nanotubes.) Because the threshold voltage for ionization is species specific, each nanotube in the array is tuned (either by radius, by voltage, or both) to a particular or a particular subset of species of atoms or molecules. Each nanotube captures and ionizes atoms or molecules of its species and ejects ions towards a corresponding dedicated sensing area in a position-sensitive ion detector, such as a position-sensitive microchannel plate. In some cases, the position-sensitive ion detector may include subareas dedicated to a particular section of a particular nanotube. Sensing an ion (or group of ions) at a particular sensing area indicates the presence of a corresponding atom or molecule.

It should be noted that high efficiency sidewall ionization can be achieved with a variety of charged one-dimensional nanostructures such as, but not limited to, single-walled or multi-walled carbon nanotubes, nanowires, nanorods, nanocylinders, or an edge of a single graphene sheet. A wide variety of species can undergo sidewall ionization, including atoms, organic or inorganic molecules, and biomolecules.

Figure 2:
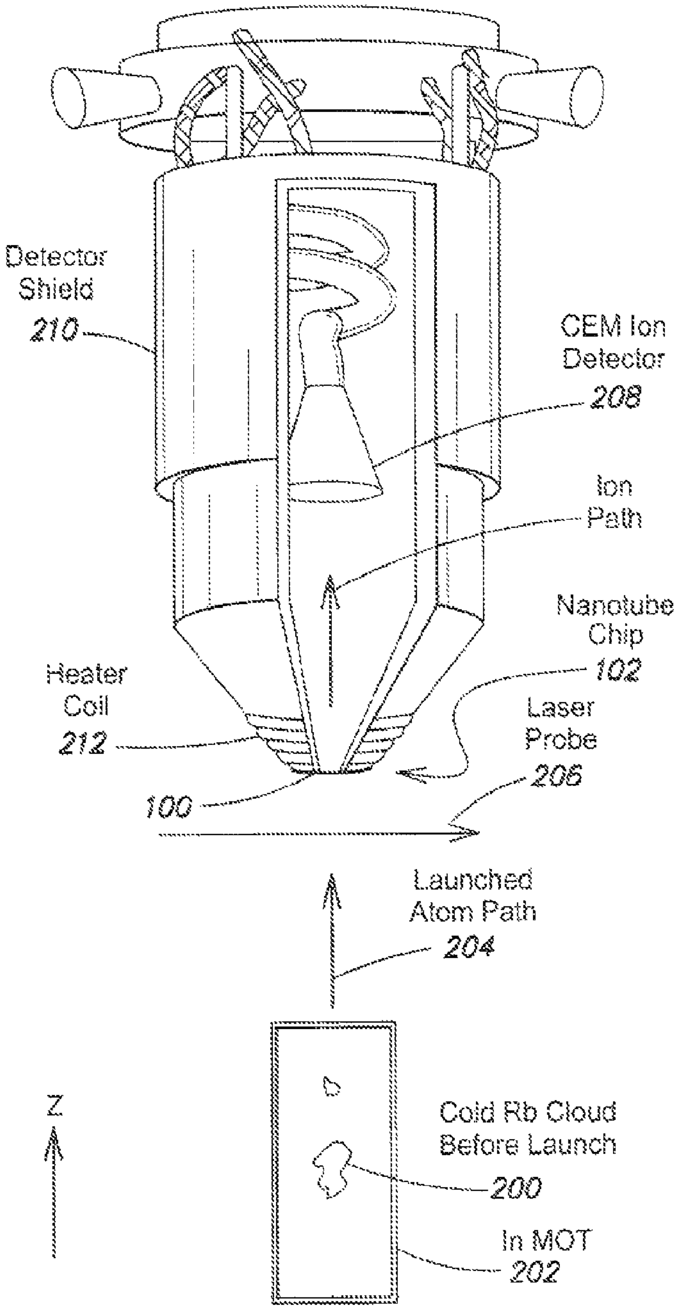
FIG. 2 is a schematic diagram of an exemplary experimental setup.

Referring to FIG. 2, in one example, rubidium atoms 200 (shown in a fluorescence image) are laser cooled in a stationary magneto-optical trap (MOT) 202 to 200 μK. In other embodiments, the atoms or molecules are provided by a thermal beam. The use of ultra cold atoms from a MOT increases the signal-to-noise ratio of subsequent measurements by several orders of magnitude over what can be obtained with thermal atoms (e.g., from a thermal beam).

A pulse 204 of rubidium atoms is periodically launched (e.g., once every two seconds) and travels a distance of 22 mm to nanotube 100. In this example, nanotube 100 has a radius of 3.3 nm and is positively charged. Each cold atom pulse contains $10^6$ rubidium atoms and has a simple, initial transverse diameter of 0.55 mm and a more complex longitudinal profile (described in greater detail below). The absorption profile of each atom pulse is monitored with a horizontally-propagating laser beam 206 positioned just below sample 102. A channel-electron multiplier (CEM) 208 is positioned 25 mm above nanotube 100 and acts as an ion detector, counting single ions released from the nanotube. A detector shield 210 shields CEM 208, minimizing background counts. The operation of MOT 202 and CEM 208 is described in greater detail below.

In other examples, the nanotube is negatively charged and negatively charged ions are generated from appropriate incident atoms or molecules. In still other instances, electrons are generated with or without incoming atoms or molecules. In some cases, an electron is emitted from a negatively charged nanotube or nanowire without an incident atom. In other cases, an incoming atom can enhance electron emission from the wire. The electron transfers (e.g., tunnels) from the nanowire to the incoming atom and from the atom into a free state; the electron is then ejected from the environs of the negatively charged nanowire. In this case, extra electrons originating from within the atom itself may also be ejected in addition to the electron originating from (e.g., tunneling from) the nanowire. Thus, field emission of electrons can be achieved from the sidewall of a nanowire. Given that the area of the sidewall is huge compared with the tip of a nanowire, field emission that is well defined and with much larger emission currents can be achieved with sidewall emission. The electron emission current can be further enhanced by incoming atoms in that an incoming atom acts as a catalyst, dramatically enhancing the rate of electron tunneling. Thus, sidewall field emission sources can be run at low voltages, which is important, for instance, in low power video displays.

In other embodiments, the ions leaving the nanotube may be received by another device, such as a position-sensitive microchannel plate, a mass spectrometer, or an energy spectrometer, instead of or in addition to CEM 308.

Experimental and Theoretical Results

Figure 3A:
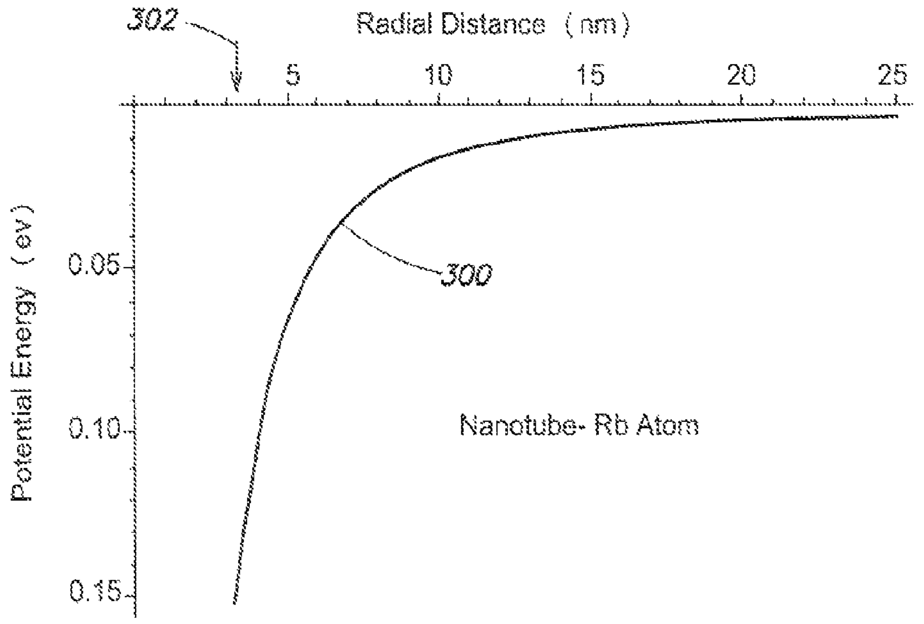
FIG. 3A is a plot of the attractive potential between a neutral rubidium atom and a charged carbon nanotube.

Referring to FIG. 3A, theoretically, a linearly polarizable neutral atom in an external beam is attracted by a $1/r^2$ potential to a uniformly charged, thin, extended wire, where r is the distance from the central axis of the wire to the atom. For instance, the attractive potential between a neutral rubidium atom (with a polarizability of 47 Å$^3$) and a single-walled carbon nanotube charged to 150 V is shown as a curve 300. An arrow 302 indicates the position of the surface of a 3.3 nm radius nanotube. Because this attractive potential is proportional to the square of the voltage on the wire, the attractive potential between a positively charged wire and a neutral atom has the same form as the attractive potential between a negatively charged wire and a neutral atom.

Figure 3B:
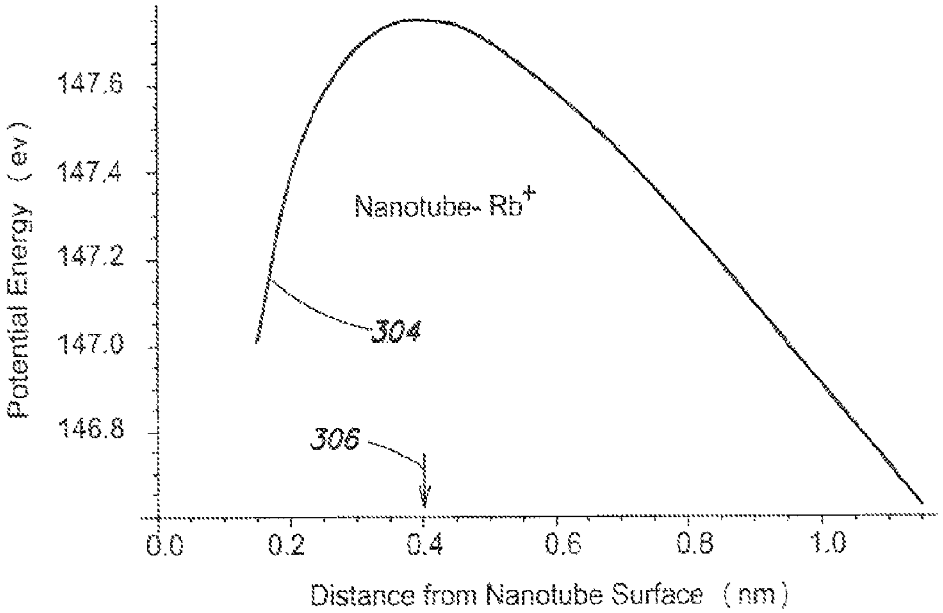
FIG. 3B is a plot of the interaction potential between a positively charged rubidium ion and a positively charged carbon nanotube.

Referring to FIG. 3B, the interaction potential between a uniformly and positively charged, thin, extended wire and a positively charged ion is a combination of the repulsive electrostatic potential between the ion and the positively charged wire and the image potential induced by the ion. For instance, the interaction potential between a 3.3 nm radius nanotube charged to 150 V and a singly charged $Rb^+$ ion is shown as a curve 304.

Classical equations of motion predict that there are two possible trajectories for neutral atoms approaching a uniformly charged, thin, extended wire. Atoms that approach the wire with an angular momentum L (more specifically, a component of the angular momentum along the direction of the wire) greater than a critical value $L_c$ initially spiral in towards the wire but ultimately escape from the vicinity of the wire. Atoms that approach the wire with an angular momentum L less than $L_c$ will be captured into a trajectory that spirals in towards the wire with no possibility of escape. These captured atoms ultimately impinge on the surface of the wire. The orbit of a captured atom can be described in cylindrical coordinates as $$r(\theta) = \frac{bk}{\sinh(k\theta)},$$

where $k^2=L_c^2/L^2-1$. The impact parameter, b, of the captured atom, is proportional to the angular momentum of the atom: b=L/mv, where m is the mass of the atom and v is the launch velocity of the atom. Thus, atoms with an impact parameter greater than a critical impact parameter $b_c=L_c/mv$ escape the wire; atoms with an impact parameter less than $b_c$ are captured by the wire. That is, the nanotube acts as a 'black hole' for those atoms with an impact parameter less than $b_c$.

The critical angular momentum $L_c$ is proportional to the voltage, $V_{NT}$, on the nanotube, as follows:

$$L_c = \frac{V_{NT}\sqrt{\alpha m}}{\ln(R/r_{NT})},$$

where $r_{NT}$ and R are the radius of the nanotube and the radius of an effective outer cylinder at the reference potential, respectively; α is the DC polarizability of the incident atom; and m is the atomic mass of the incident atom. For the calculations presented herein, a value of 1 cm was used for R; however, the results are in general fairly insensitive to the value of R, given that R appears only within a logarithm.

The critical impact parameter, $b_c$, is proportional to $L_c$ and thus scales linearly with the applied voltage $V_{NT}$ and inversely with the launch velocity of the atoms. For a nanotube biased at 300 V, the critical angular momentum for a rubidium atom is about 5000 ħ. For an atom velocity of 5.3 m/s, the critical impact parameter $b_c$ is about 750 nm, or more than two orders of magnitude larger than the diameter of a typical single-walled nanotube. For high applied voltages, the ion is created outside the image potential barrier and promptly ejected from the surface of the nanotube. For lower applied voltages, the ion is created at the surface of the nanotube and is temporarily trapped near the surface. The transition point between prompt ejection and temporary trapping depends on the ion species and the radius of the nanotube.

The capture range, or the distance from the nanotube within which an atom will be captured with 100% certainty, also relates to the applied voltage and the temperature of the atoms. The capture range for atoms directed at the nanotube from relatively far away is generally about 1 μm; however, the capture range may be as wide as 35 μm for an on-chip atom interferometer (described in more detail below) based on a Bose-Einstein condensate.

An atom with an impact parameter just below the critical impact parameter $b_c$ at first orbits the nanotube and then enters a phase of dramatic collapse towards the tube. The kinetic energy of the accelerated atom increases by four orders of magnitude during the collapse phase, and the orbit time decreases to picoseconds. A sufficiently high positive charging voltage on the nanotube enables a valence electron on the atom to tunnel into the nanotube, transforming the atom into an ion. The ion is then ejected with high kinetic energy from the vicinity of the nanotube by Coulombic repulsion between the positively charged nanotube and the positively charged ion. For the example shown in FIG. 3B, when a rubidium atom ionizes within the potential barrier at 0.4 nm (indicated by an arrow 406), the ion is trapped near the surface of the nanotube. Repulsive interactions (not shown) are dominant for distances below about 1.5 Å, as estimated from measurements of nanoscale interaction dynamics. A created ion is trapped in the resulting potential minimum for roughly a millisecond.

In some embodiments, the incident atoms are excited, for instance by a laser or an electron beam, prior to arriving at nanotube 100. Atoms in an excited state are more easily polarizable and thus have a lower ionization energy than their ground state counterparts. A lower electric field is thus capable of ionizing the incident excited atoms.

Figure 4:
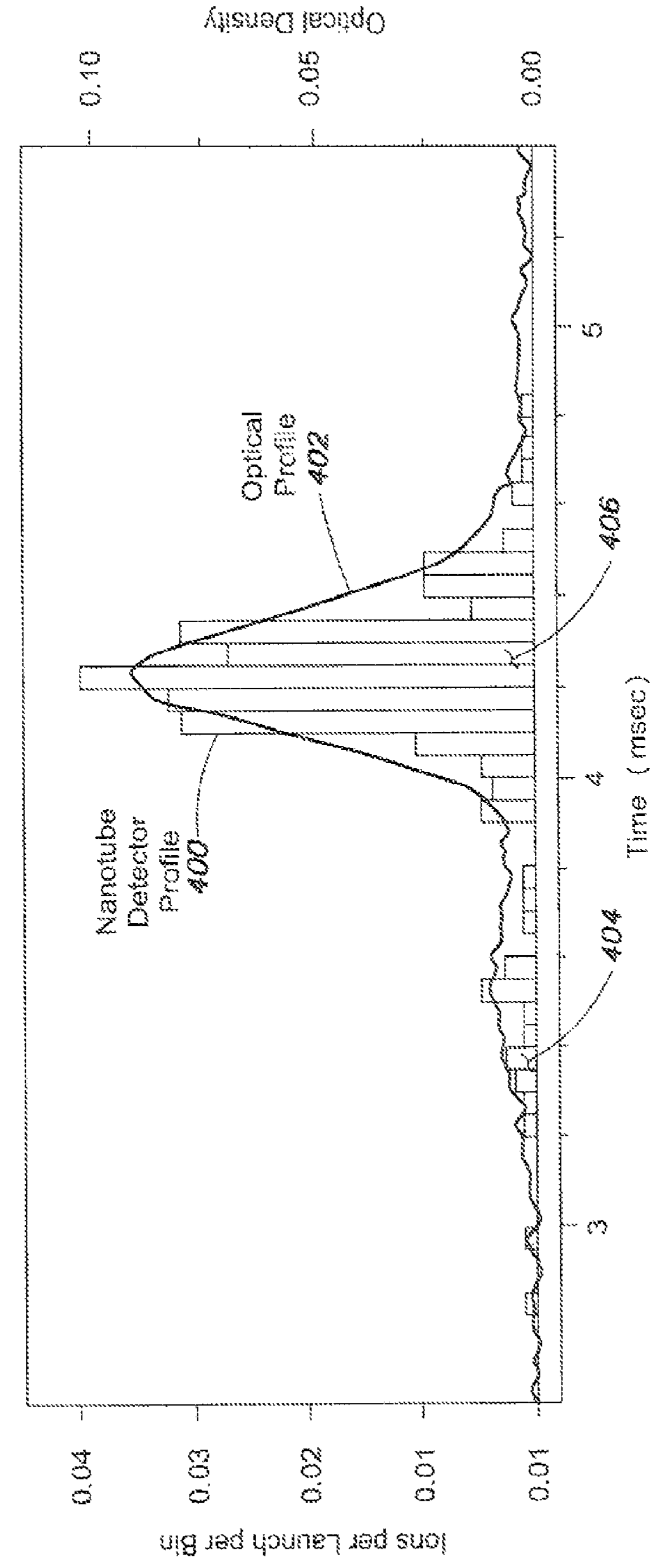
FIG. 4 is a plot of the time distribution of ions detected by a channel-electron multiplier (CEM).

Referring to FIGS. 2 and 4, the capture and ionization of single atoms can be observed by detecting the ejected ions with CEM 208. A histogram shows the time distribution 400 of ions detected by CEM 208, measured from the time of launch. The histogram has a bin size of 50 μsec and includes measurements from a total of 259 ejected ions. In this example, nanotube 100 was kept at a voltage greater than 200 V. A solid line represents the optical density profile 402 of the incident atom pulse 204 as it passes the probe laser beam 206 (i.e., before the atoms arrive at nanotube 100). To enable a direct comparison between the time distribution 400 of the detected ions and the profile 402 of the incident pulse 204, the optical density profile 402 of the pulse has been offset by 0.33 msec, which is the time-of-flight for atoms travelling between laser probe 206 and nanotube 100.

Optical density profile 402 reveals that incident pulse 204 is composed of a main lobe 404, approximately 300 μsec in width, and a secondary structure 406 leading main lobe 404 by about 700 μsec. The ion signal 400 has a slightly narrower time spread consistent with the finite size (210 μm) of probe laser beam 206. The nanotube capture results presented below have been normalized to the incident atomic beam intensity deduced from optical absorption measurements.

Figure 5:
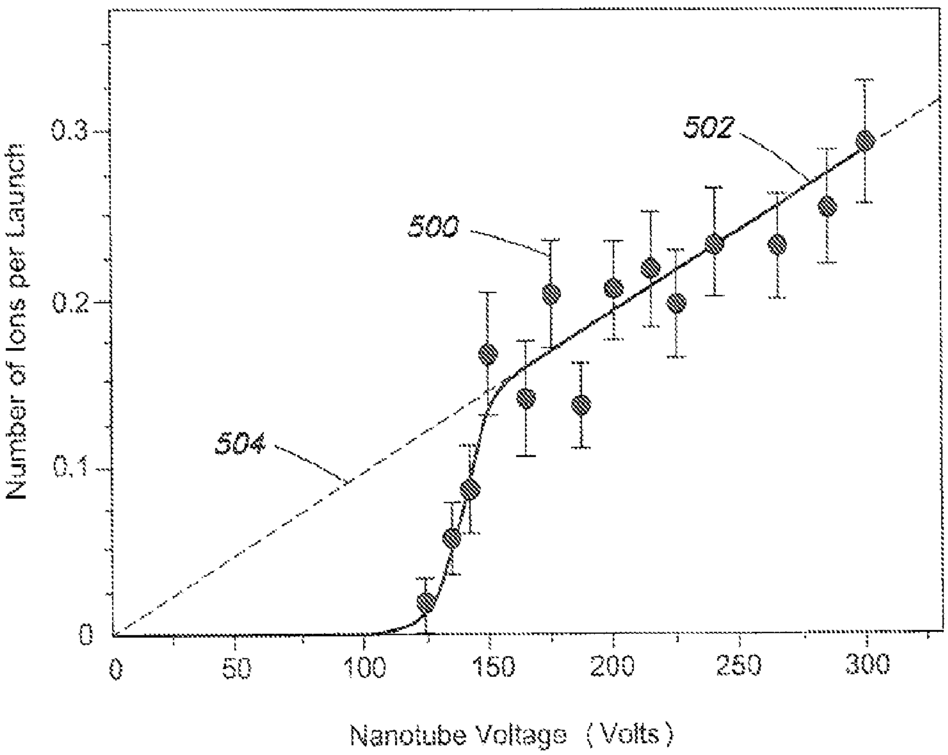
FIG. 5 is a plot of the number of ions detected as a function of nanotube voltage.

Referring to FIG. 5, the average number of ions detected per launched atomic pulse is shown as a function of nanotube voltage from 0 V to 300 V. For each pulse, ions are counted in the time interval $3.0 \leq t \leq 5.6$ msec (from the time of launch), as determined from the results in FIG. 4. An experimentally detected ion signal 500 is shown as a series of points, with error bars representative of the standard deviation of the measurement determined from counting statistics. Theoretical results 502 based on a model of ion behavior, assuming a nanotube radius of 3.3 nm, are shown as a solid curve. The experimental results 500 and the theoretical results 502 are in good agreement.

The experimental and theoretical detected ion signals 500, 502 are proportional to the nanotube voltage in the region above 150 V. This linear proportionality is a direct manifestation of the dynamics of the atom capture process and corresponds to the linear increase of the critical impact parameter $b_c$ with voltage as discussed above. Based on optical density measurements and the measured transverse atomic cloud size at the position of the sample, it can be estimated that 5-10 atoms are captured by the nanotube for each launch pulse. This estimate suggests a detection efficiency of 5% for atoms incident within the critical impact parameter, consistent with the efficiency of the CEM detector and with solid angle considerations (e.g., the relative positioning of the sample and the detector).

The detected ion signal 500, 502 increases abruptly from zero over a 25 V range 504 starting at a threshold voltage of 125 V. This increase can be explained by considering the process of electric field stimulated electron tunneling close to the nanotube. A rubidium ion is created when the valence electron of a rubidium atom tunnels across the potential barrier formed of the combination of the electrostatic potential from the $Rb^+$ core and the positively charged nanotube. The tunneling rate for the valence electron, which corresponds to the probability that an atom will ionize at the nanotube, increases exponentially with the strength of the electric field generated by the charged nanotube at the location of the atom, as determined by a WKB approximation. For instance, the tunneling rate can approach $10^{12}\ s^{-1}$ as the field 3 V/nm. The strength of the electric field varies inversely with the distance between the atom and the central axis of the nanotube. Thus, for a given voltage applied to the nanotube, the probability that a captured atom will be ionized as it spirals towards the nanotube can be calculated.

With a nanotube radius of 3.3 nm, and for voltages above 150 V, such calculations reveal that the field is so large that a captured atom will ionize with 100% probability. A dashed line 504 reflects the linear voltage dependence of the critical impact parameter $b_c$ for atom capture and corresponds to what would be measured if atoms were ionized with 100% probability at all voltages. The dashed line agrees with the data in the high-voltage regime. However, the threshold behavior between 125 V and 150 V indicates that a minimum electric field is important for efficient electron tunneling. The value of the threshold voltage is a sensitive measure of the radius of the nanotube and the ionization energy of the incident atom or molecule.

The threshold voltage is dependent on the radius of the nanotube and the ionization energy of the species incident on the nanotube. As such, the threshold voltage is a sensitive probe for species identification. An incident pulse including two separate species would give rise to two threshold voltages, one voltage corresponding to each species.

Figure 6A:
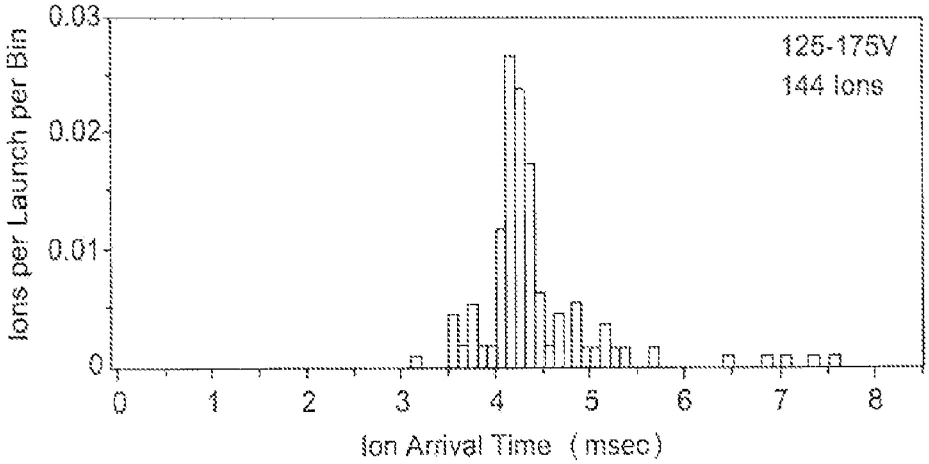
FIGS. 6A and 6B are plots of arrival times of single ions at the CEM for nanotube voltages between 125-175 V and 250-300 V, respectively.
Figure 6B:
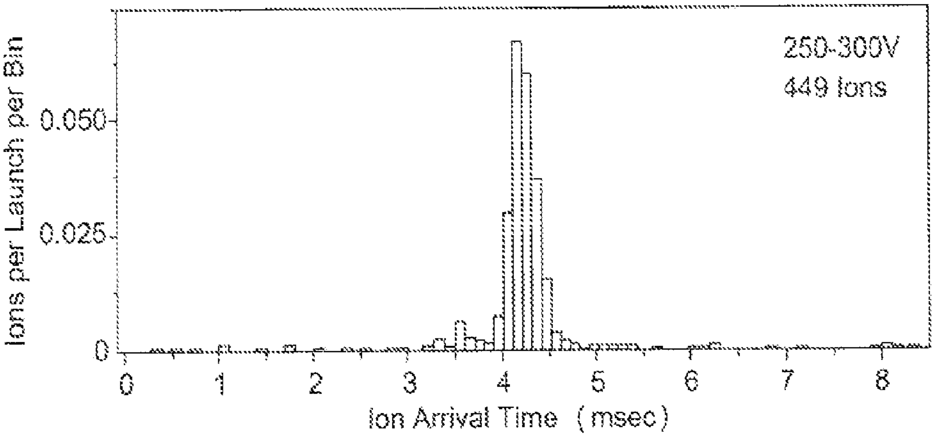

Referring to FIGS. 6A and 6B, the arrival times of single ions at the CEM, measured from the time of launch of the atom pulse from the MOT, were determined. Arrival events are recorded (with a resolution of 60 nsec) in a time window spanning 50 msec both before and after the launch time. The bin size is 100 μsec. The background count, shown in the time frame from 0-3 msec, is negligible (3.0 ions/sec at 300 V).

In FIG. 6A, the distribution of arrival times is shown for nanotube voltages between 125-175 V (i.e., near the threshold for ionization). For voltages close to the threshold voltage, many ions arrive at the detector with significant time delays. At these voltages, ionization of a rubidium atom occurs within 0.4 nm from the nanotube surface, as shown in by the interaction potential in FIG. 3B. The resulting rubidium ion becomes temporarily trapped near the surface of the nanotube by its induced image potential. The trapped ion orbits the nanotube with orbit times of tens of picoseconds, and escapes only after a delay time that is determined by its ability to overcome the binding energy to the nanotube, either thermally or via surface defect interactions.

The thermal escape process is governed by Boltzmann statistics. The radial, image-potential surface trap frequency is about $10^{13}$ Hz. For an ion in thermal equilibrium with the nanotube (which is kept at the substrate temperature of 100° C.), a Boltzmann distribution of ion energies is expected. The escape rate of a bound ion from the trapping potential is determined by the product of the trap frequency and the fraction of ions in the Boltzmann tail above the trap barrier. The barrier is dependent on the nanotube voltage and the minimum of the trap potential. For a barrier height of 0.8 eV above the minimum, this model accounts for the observed millisecond delay times for the ion arrivals of FIG. 6A.

In FIG. 6B, the distribution of arrival times is shown for nanotube voltages between 250-300 V, well above the threshold voltage. These voltages correspond to the linear region of FIG. 5 (i.e., to the right of the arrow). For these high voltages, the electric fields are large enough to cause ionization of incident neutral rubidium atoms before they enter the image potential barrier. These ions are therefore ejected promptly from the vicinity of the nanotube, as reflected in the narrow spread of arrival times in FIG. 6B.

Additional Embodiments

In some embodiments, the ions leaving nanotube 100 are received by a position-sensitive microchannel plate rather than by a CEM. The ions are ejected along field lines emanating from the nanotube. Thus, the position at which an ion strikes the microchannel plate can be used to determine the position along the length of nanotube 100 where the ion was created. With proper setup and the use of ion optics, nanometer or sub-nanometer resolution can be achieved for the position along the wire where the ion was created. Inserting ion optics between nanotube 100 and the microchannel plate magnifies the image received by the microchannel plate, further improving the position sensitivity. Alternatively, a curved nanotube can be used to improve the position sensitivity. In this case, because the ions follow field lines perpendicular to the length of the nanotube at the point of ionization, the curvature of the nanotube causes a magnifying effect. The magnification is proportional to the distance between the nanotube and the microchannel plate and inversely proportional to the radius of curvature of the nanotube.

Combined with the large atom capture range perpendicular to the nanotube, the use of a position-sensitive microchannel plate allows direct measurement of fringes of interfering matter waves, for example in a chip-based atom interferometer. Interference fringes, for instance arising from the interference of two matter waves (e.g., resulting from the recombination of a split beam of cold atoms or thermal atoms), are perpendicular to the length of the nanotube, such that alternating dark and light fringes occur along the nanotube. Expanding the fringes onto a position-sensitive microchannel plate (e.g., via ion optics) enables resolution of the fringes, even for a fringe spacing of 1 nm or less. Such fringe resolution may be useful, for instance, for navigational gyroscopes or gravity gradiometers.

Figure 7A:
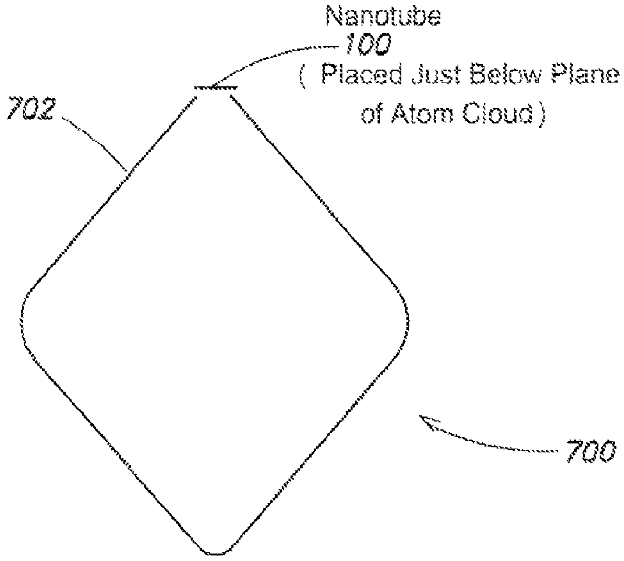
FIGS. 7A-7F is a schematic diagram of an inventive atom interferometer.
Figure 7B:
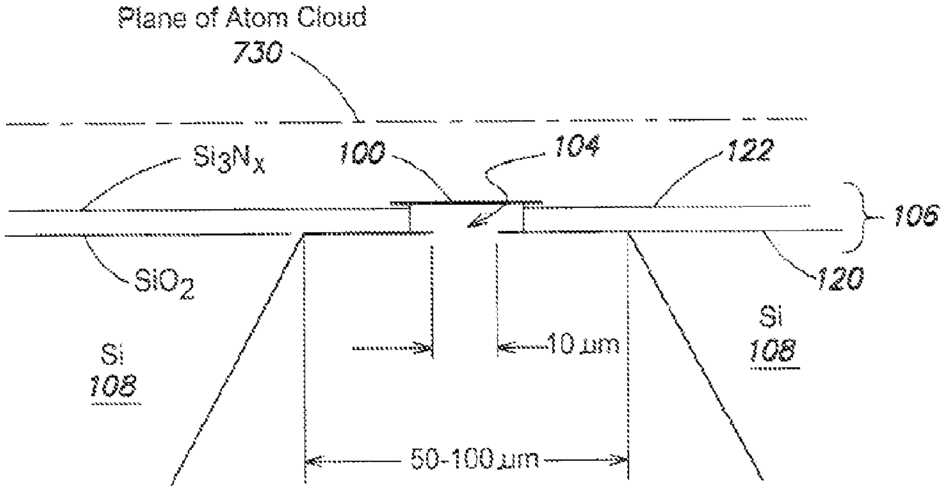

FIGS. 7A and 7B show plan and perspective views, respectively, of an exemplary atom interferometer 700 arranged in a Sagnac configuration. A nanotube 100 is suspended over a gap in a silicon substrate 108 below one corner of an atom path 702, which is in an atom plane 730 parallel to the plane of the substrate surface. Typically, the distance between the nanotube 100 and the plane 730 of the atom path is on the order of microns to tens of microns, so long as the capture range of the charged nanotube extends into the atom plane 730. The exact distance can be adjusted to account for nanotube radius, charging voltage, atom velocity, and atom ionization energy. The nanotube 100 functions as described with respect to FIG. 1.

Figure 7C:
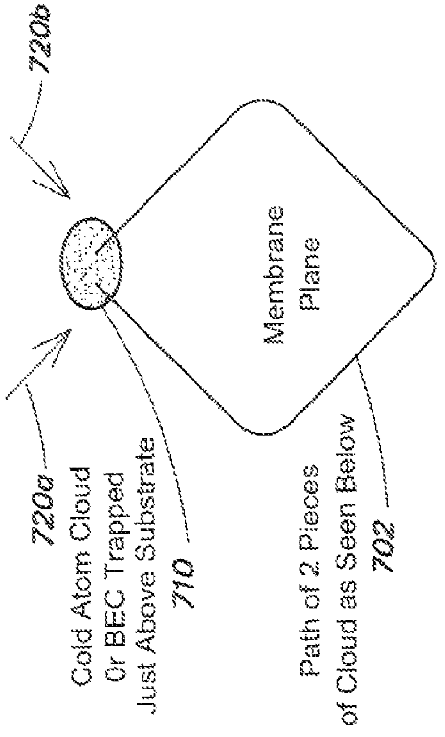
Figure 7D:
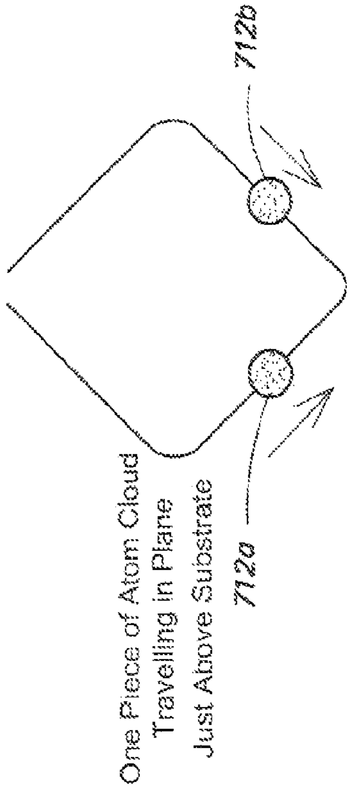
Figure 7E:
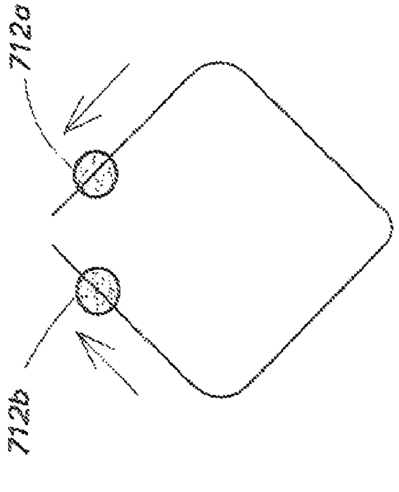
Figure 7F:
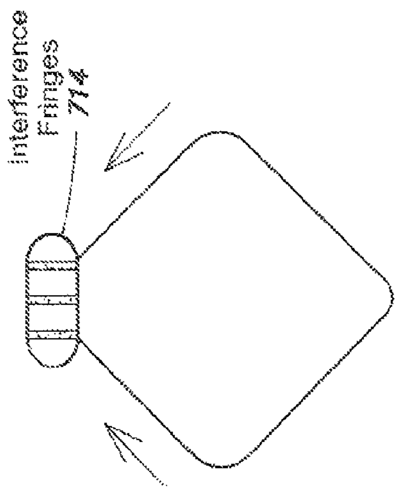

FIGS. 7C-7E illustrate the operation of the atom interferometer 700 shown in FIGS. 7A and 7B. From an atom trap (not shown), such as a magneto-optical trap, a cold atom cloud or condensate (e.g., a Bose-Einstein condensate) 710 is directed in the atom path plane 730 to a position above the suspended nanotube 100, which is at an electrostatic reference potential. (In some cases, the reference potential may vary in time, e.g., in a pulsed fashion). Laser beams 720*a* and 720*b* intersect in the atom cloud 710, producing a standing wave interference pattern that diffracts at least a portion of the atom cloud 700 into a +1 diffracted order 712*a* and a −1 diffracted order 712*b*—that is, the laser beams 720*a*, 720*b* act as a diffractive beamsplitter. (Of course, higher-order diffractions may be produced instead of or in addition to the ±1 diffracted orders.) Because the laser beams 720*a* and 720*b* are angled with respect to each other, they also impart a net momentum to the diffracted orders 712*a*, 712*b*.

Upon diffraction from the standing wave interference pattern, the diffracted orders 712*a*, 712*b* propagate along a ring-like beam path 702 in the atom plane 730 as shown in FIGS. 7D and 7E. The diffracted orders 712*a*, 712*b* may be guided by fields and/or waveguides along the path 702. For example, the diffracted orders 712*a*, 712*b* can be guided by a magnetic field induced by selectively applying current to wires arrayed in a plane parallel to the atom path plane 730, e.g., on top of the substrate 108 shown in FIG. 7B. Alternatively, reflective or diffractive elements positioned at corners of the path 702 may redirect the diffracted orders 712*a*, 712*b*. For more information on creating and guiding diffracted orders 712*a*, 712*b*, see, e.g., S. R. Segal, "Progress towards an ultracold atomic Sagnac gyroscope," Ph.D. dissertation, University of Colorado, 2010, incorporated herein by reference in its entirety.

Eventually, the diffracted orders 712*a*, 712*b* recombine above the nanotube 100 to form a matter wave interference pattern 714 whose fringe positions depends on the phase mismatch between the diffracted orders 712*a*, 712*b*. Charging the nanotube 100 to a sufficiently high potential causes the matter wave interference pattern to collapse onto the nanotube 100. The atoms (or atomic matter wave amplitude) clustered at antinodes in the matter wave interference pattern 714 follow(s) a spiral trajectory from the atom plane (or from the proximity of the atom plane) 730 onto particular points on or at the nanotube 100, producing an ionized fringe pattern on or at the surface of the nanotube 100 that can be detected as described with respect to FIGS. 1 and 2. Nodes in the matter wave interference pattern 714 are devoid of atoms, so at those particular points on or at the nanotube 100 that correspond to positions of the nodes in the matter wave interference pattern 714 no ions are created.

As understood by those of skill in the art, the phase mismatch (and hence the fringe positions) in a Sagnac interferometer, such as atom interferometer 700, varies with the angular velocity: rotating the interferometer 700 about an axis normal to the atom plane 730 causes the fringes to shift. Those skilled in the art will also appreciate that other interferometric configurations, such as Michelson and Mach-Zehnder configurations, fall within the scope of this disclosure, and that these other configurations can be used to measure changes in path length and/or phase mismatch due to externally exerted forces, temperature-induced expansion and contraction, etc. Atom interferometers can also be used to measure forces and variations in force (e.g., gravitational forces, gradients in gravitational forces, and/or gravity waves). Nanotube sensors transduce these otherwise hard-todetect changes in matter-wave fringe periodicity and/or fringe positions caused by changes in velocity, angular orientation, and externally applied force into detectable, ion-based interference patterns.

Using a position-sensitive microchannel plate, high resolution around the circumference of the nanotube can also be achieved, enabling a precise determination of where around the nanotube the ion was created. The magnification is the ratio of the distance between the nanotube and the microchannel plate and the radius of the nanotube, which can be on the order of $10^6$ to $10^7$. This extremely high degree of magnification allows for circumferential resolution of below 0.01 nm around the nanotube. Such high resolution may be useful, for instance, for density and quantum correlation measurements in cold and thermal atomic gases. Detection is generally more effective when a high voltage is applied to the nanotube, allowing an ion created outside the image potential barrier to be promptly ejected from the vicinity of the nanotube.

Figure 8:
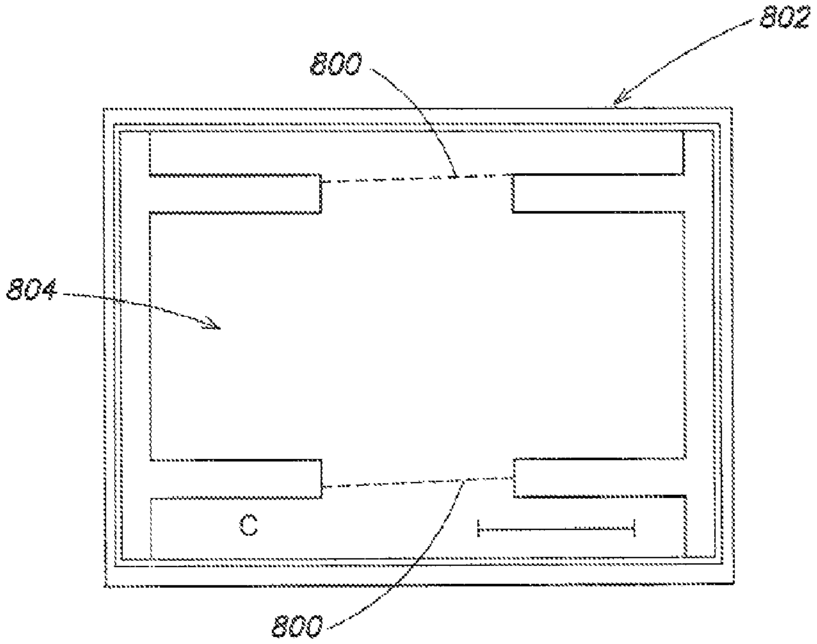
FIG. 8 is an SEM image of a sample including two parallel, suspended carbon nanotubes.

Referring to FIG. 8, in some embodiments, a sample 802 includes two or more nanotubes 800 suspended across a gap 804. In the SEM image of FIG. 7, the two parallel, suspended nanotubes 800 are shown before electrodes are evaporated onto the sample. High contrast imaging is used to show the location of the nanotubes. The use of an array of nanotubes improves the total capture cross-section because the electric field generated by the nanotubes extends further than the electric field generated by a single nanotube (that is, the capture cross sections from the individual nanotubes add up). The nanotubes are preferably spaced by one to two times their capture range, thus allowing full coverage of the space surrounding the nanotubes with minimal overlap of the capture ranges from each nanotube. An array of nanotubes in combination with a microchannel plate (which provides position sensitivity along the length of a nanotube) enables position sensitivity also in a direction perpendicular to the length of the nanotube. The scale bar of the image is 10 μm.

In other embodiments, atoms are stably trapped, for example, at or close to the surface of the nanotube for extended timescales by applying an AC voltage to the nanotube. For instance, atoms are captured from a distance of several microns, and the orbit radius of a trapped atom is lowered adiabatically to a few tens of nanometers. In some instances, the atom may be captured from a macroscopic distance with a DC field alone; when the atom gets within a certain range of the nanotube, the AC voltage is turned on to trap the atom close to the surface. The trapped atom can be released and detected by turning off the AC voltage or by increasing the DC voltage. A second nearby nanotube (e.g., as shown in FIG. 7) can be separately charged and applied as an atom detector with high spatial and temporal resolution. In one or both cases quantum correlations in the trapped atom cloud can be probed. For multiple trapped atoms, the induced electric dipole moments induce strong dipole-dipole coupling and, potentially, novel, highly correlated states that can be probed directly. In some cases, the nanotube may be decorated with nanometallic structures which can aid in the loading and/or trapping of atoms.

When the launch velocity is large compared to the velocity spread of a launched atom cloud, time discrimination among orbits with different angular momentum is possible. Quantization of angular momentum results in step increases of the atom capture cross-section with increasing nanotube voltage (e.g., in steps of 60 mV/$\hbar$ for rubidium). With appropriate measurement statistics, these quantum steps can be resolved as a "quantum ladder," for example by using time-of-flight measurements. The resolution of a quantum ladder allows for probing of properties of the nanotube, for example.

More specifically, when a Bose-Einstein condensate (BEC) is launched toward a nanotube with a launch velocity of about 10 cm/s, atoms in the BEC are attracted to the nanotube from distances of up to 40 μm, or about 10,000 times the diameter of the nanotube. The DC potential to the nanotube is switched on when the BEC reaches a distance from the tube equal to the minimum distance of approach of the BEC without the DC potential. Once the DC potential is turned on, atoms in the BEC that are incident with angular momentum L significantly below the critical value $L_c$ spiral toward the nanotube under tremendous acceleration, reaching velocities of 600 m/s or roughly $k_B$*2000 K of kinetic energy and arriving at the nanotube in a few microseconds or less. However, the fate of those atoms in the BEC that are incident with momentum close to $L_c$ is dramatically different: these atoms orbit the nanotube for several milliseconds before their orbit time decreases to a few picoseconds as they quickly spiral in toward the tube to be field ionized. The time to reach the nanotube differs by several milliseconds for orbits differing by just one unit of angular momentum. The number of BEC atoms captured per quantum step can be roughly 100. The voltage position of the quantum steps can therefore be determined with great precision using time-of-flight measurements.

The quantum ladder can be used to study properties of the nanotube. For instance, the quantization of angular momentum can be used to probe quantum capacitance, which plays an important role in the electronic properties of nanodevices. Cold atom dynamics, including the precise location (i.e., voltage) of each quantum step, are determined by the electric field emanating from the nanotube and hence by the applied voltage via the capacitance of the system. The charging of a nanotube to 300 V corresponds classically to a line charge of ½ elementary charge per Ångström. The extent to which increasing the voltage to the nanotube actually leads to an increased line charge depends on the availability of electron states in the nanotube. The total capacitance of the nanotube is the classical, electrostatic capacitance in series with its quantum capacitance. The latter is proportional to the density of states at the Fermi level, which changes with the voltage applied to the nanotube. The precise determination of the voltage positions for the steps of the quantum ladder thus allows for particularly sensitive probing of quantum capacitance and the density of states over a large range of band energies. The density of states in a nanoscale structure can thus determine the fate of cold atoms located tens of microns away from the structure.

The perpendicular spatial resolution of a nanotube is generally determined by the capture cross-section of the nanotube, as described above. However, through the use of high-resolution time discrimination for prompt events, the perpendicular spatial resolution can be increased by several orders of magnitude, particularly in the region close to the critical impact parameter. As described above, time discrimination can distinguish between different values of angular momentum close to the critical value; each angular momentum step corresponds to a change of impact parameter in the nanometer to sub-nanometer range. The quantum ladder thus forms the basis for sensitive probing of, for instance, vibrations of the nanotube. Vibrational properties of suspended nanotubes are of great importance for developing nanotubes into mass sensors for single atoms or molecules. At room temperature, thermal excitations are estimated to cause vibrational amplitudes of about 1 nm for nanotubes a few microns long. This amplitude is comparable to the change of 7 nm in the classical critical impact parameter corresponding to one angular momentum step of the quantum ladder (for a 10 cm/s launch velocity of, for instance, a BEC). By measuring step smearing of the ladder as a function of substrate temperature and launch velocity, nanotube vibrations can be measured with great sensitivity.

Sample Preparation and System Operation

In the example of FIGS. 1A-1C, each sample 102 is 3 mm×3 mm in size and is cut from a 525 μM thick silicon wafer (p-type with resistivity of 10-20 Ω·cm at 300 K) with an overlayer of silicon dioxide ($SiO_2$) and low-stress silicon nitride ($Si_3N_x$) on both sides. An $SiO_2$ layer 120 and an $Si_3N_x$ layer 122 are shown on the top side of sample 102; the layers on the bottom side are not shown. After using photolithography and a reactive ion etch to selectively remove the bottom layer of $Si_3N_x$, an anisotropic silicon etch is applied to form membrane 106, which is a free-standing 70×70 $\mu m^2$ membrane formed of $SiO_2$ 120 (with a thickness of 2 μm) and $Si_3N_x$ layer 122 (with a thickness of 200 nm). Gap 104 in membrane 106 is 10 μM wide and is formed by ion beam milling with a focused ion beam (FIB). Catalyst pads (not shown) are e-beam evaporated onto the ends of the long membrane aims using a shadow mask. The catalyst pads are formed on 1 nm of iron (Fe) on top of 10 nm of alumina ($Al_2O_3$).

Single-walled carbon nanotubes 100 are grown from the catalyst pads and across gap 104 in a chemical vapor deposition (CVD) oven heated to 850° C. and with methane as the carbon source. Precise tuning of the growth conditions, including the temperature, gas composition, and timing, enables the nanotubes to withstand voltages up to or in excess of 300 V, as described above. The nanotube in FIGS. 1A-1C has a length of about 10 μm and a radius of 3.3 nm; however, a shorter nanotube (e.g., with a length on the order of ten times the radius) may also enable sidewall ionization. A nanotube that is not sufficiently long may allow shielding from electrodes 110*a*, 110*b* to diminish the electric field, reducing or eliminating sidewall capture and/or ionization.

After nanotube growth, electrodes 110*a*, 110*b*, formed of 10 nm of Mo on top of 50 nm of Ti, are evaporated by an electron beam (e-beam) evaporator onto sample 102. (No degradation of the electrodes is observed even after extended periods of exposure to rubidium). To prepare for electrode deposition, a shadow-mask stencil is milled with the FIB, mounted in a translatable holder with about 20 μm of clearance above sample 102, and aligned under an optical microscope. The patterned Ti/Mo strips cover the top surface of the membrane arms, creating well-defined 2 μm wide electrodes, and also wet the ends of nanotube 100 to improve contact. While a wet lithography process may contaminate or damage long suspended nanotubes, the post-growth e-beam patterning of electrodes 110*a*, 110*b* leaves the nanotubes unharmed. The maintenance of the quality of the nanotubes further contributes to the ability of the nanotubes to withstand the voltages used to induce ionization.

Electrodes 110*a*, 110*b* are contacted to 2 mm macroscopic contact pads (outside the field of view of FIGS. 1A-1C), and a high voltage is applied to nanotube 100 via a clip connection to one or both pads. The size and geometry of the electrodes was selected to minimize shielding effects from the electrodes, which, if present, would reduce the high electric fields generated by the charged nanotube 100. The electrode design was optimized with numerical modeling based on a finite-element analysis using COMSOL Multiphysics® (a commercial software package by COMSOL AB, Burlington, Mass.). The full three-dimensional structure of sample 102 was included in the finite-element analysis to confirm that the electric fields are determined from the charge density on the nanotube and that shielding effects from the 2 μm wide electrodes are negligible.

Referring again to FIGS. 1 and 2, sample 102 is placed in a vacuum chamber pressurized to $10^{-9}$ Torr. Sample 102 is mounted upside-down (i.e., with nanotube 100 facing MOT 200 and silicon substrate facing upwards toward CEM 208. The sample is held at the apex of a cone-shaped sample holder, which conforms to the geometry of the laser beams of MOT 200. An x-y-z translation stage allows continuous scanning of sample 102 in three dimensions. Using a wrapped-wire heater coil 212, the sample temperature is slightly elevated (e.g., to 100° C.) to prevent the accumulation of rubidium on the sample. Silicon substrate 108 is grounded (or more generally kept at the reference potential) and one or both of electrodes 110*a*, 110*b* are charged to positive voltage, inducing a uniform positive charge on nanotube 100 and generating the atom-capturing and ionizing electric field.

Two-dimensional MOT is operated in pulsed mode to cool, confine, and launch clouds of $^{85}Rb$ atoms. Four trapping laser beams are used and elongated current coils generate magnetic gradients in two horizontal directions in MOT 200. The MOT is vapor-loaded from an evaporable getter source for 1.25 seconds, resulting in a trapped cloud of 1 million atoms. The cloud of atoms is cooled to a temperature of 200 μK, which corresponds to an rms velocity of the atoms of 0.2 m/s. To launch the atom cloud as pulse 304, the relative detuning δ between two pairs of laser beams in MOT 200 is abruptly changed, creating a moving MOT. The launch velocity v of pulse 204 is proportional to δ, with v/δ=(1 m/s)/(1.81 MHz). A nominal launch velocity of 5.0 m/sec (δ=9.06 MHz) was selected. The actual velocity of the pulse was determined by time-of-flight measurements to be v=5.3 m/sec. This difference between nominal and actual velocities can be attributed to slight errors in optical beam alignment in MOT 200. Importantly, the launch velocity was selected to be much larger than the rms velocity of 0.2 m/s of the atoms in pulse 204; all atoms are therefore launched toward nanotube 100 with nearly the same velocity. Atoms arrive at the nanotube 4.2 msec after launch.

For each launch, the time-dependent optical density of the atom cloud is measured by laser probe beam 206, which is a weak resonant beam having a size of 140 μm×210 μm and a power of 100 nW. A peak density of $1.2\times10^9$ atoms/$cm^3$ (i.e., a peak optical density of 10%) was measured, which corresponds to a peak flux of $6.4\times10^{11}$ atoms/$cm^2$·sec. The size of pulse 204 in the horizontal plane at the position of sample 102 is 1100 μm×800 μm (FWHM), as measured by scanning nanotube 100 across the profile of the pulse.

CEM 208 is a single-channel electron multiplier such as the Channeltron® CEM manufactured by Burle/Photonis (Sturbridge, Mass.) run in discrete pulse-counting mode. The funnel-shaped detector is charged to −2300 V to detect positive ions; in other embodiments, the detector is charged to positive voltage to detect negative ions; in some embodiments it is grounded. The rim of the detector has a transverse diameter of 9.9 mm and is positioned 25 mm from nanotube 100. Individual ions incident on the CEM detector generate discrete charge pulses that are input to a charge-sensitive amplifier (e.g., an Amptek (Bedford, Mass.) A121 discriminator/preamp that requires a minimum pulse-to-pulse separation of 60 nsec). The timing of the output signals from CEM 308 is digitally recorded with an accuracy of 14 nsec. For each launch, a list of time-stamps is generated corresponding to every ion arriving during a 100 msec time window centered at the time of atom launch.

To generate the plot shown in FIG. 5, the ions that correspond to captured cold atoms are distinguished from background ions by counting only the ions that arrive within a 2.6 msec time window ($3.0 \le t \le 5.6$ msec), as determined from the histogram of ion arrival times in FIG. 4. Counts from the ionization of background rubidium vapor are accumulated in the time window before the launch ($-50 \le t \le 0$ msec). The background count rate is about 0.5-3.0 ions/sec and increases with voltage. This background contribution is negligible during the short time window of the cold-atom pulse and background subtraction is thus unnecessary.

It is to be understood that the foregoing description is intended to illustrate and not to limit the scope of the invention, which is defined by the scope of the appended claims. Other embodiments are within the scope of the following claims.

The invention claimed is:

1. A method of ionizing a neutral chemical unit, the method comprising:

A) applying a charging voltage between a substantially one-dimensional nanostructure and a reference potential to create an electric field in a vicinity of the nanostructure, so as to:

A1) capture a neutral chemical unit at a position along a length of the nanostructure within the electric field;

A2) ionize the neutral chemical unit at the position along the length of the nanostructure to generate a charged chemical unit; and A3) eject the charged chemical unit from the vicinity of the nanostructure, further comprising applying a supplemental voltage between a first end of the nanostructure and a second end of the nanostructure.

2. The method of claim 1, wherein A) comprises applying the charging voltage greater than about 200 V.

3. The method of claim 1, wherein A) comprises selecting the charging voltage such that the electric field is at least about 3 V/nm.

4. The method of claim 1, wherein A) comprises varying the charging voltage as a function of time.

5. The method of claim 4, further comprising detecting the charged chemical unit ejected in A3) as a function of time.

6. The method of claim 1, further comprising adjusting the charging voltage based on an angular momentum of the neutral chemical unit.

7. The method of claim 1, wherein A) comprises at least one of applying the charging voltage to a plurality of substantially one-dimensional nanostructures and applying a different charging voltage to each of the plurality of substantially one-dimensional nanostructures.

8. The method of claim 1, wherein the length of the substantially one-dimensional nanostructure is at least about ten times larger than the dimension of the substantially one-dimensional nanostructure perpendicular to the length of the nanostructure.

9. The method of claim 1, wherein the substantially one-dimensional nanostructure includes at least one of a single-walled carbon nanotube, a multi-walled carbon nanotube, a nanowire, a nanorod, a nanocylinder, a strip of a sheet of graphene, and an edge of a sheet of graphene.

10. The method of claim 1, wherein the neutral chemical unit includes at least one of an atom, a molecule, and a Bose-Einstein condensate.

11. The method of claim 1, further comprising directing the neutral chemical unit toward the nanostructure.

12. The method of claim 11, wherein directing the neutral chemical unit toward the nanostructure includes releasing the neutral chemical unit from a magneto-optical trap.

13. The method of claim 11, wherein directing the neutral chemical unit toward the nanostructure includes flowing gas past the nanostructure.

14. The method of claim 1, wherein, if the charging voltage is a positive voltage, then the charged chemical unit includes a positive ion, and if the charging voltage is a negative voltage, then the charged chemical unit includes at least one of a negative ion and an electron.

15. The method of claim 1, further comprising detecting the charged chemical unit.

16. The method of claim 15, wherein detecting the charged chemical unit includes detecting the charged chemical unit as a function of the charging voltage.

17. The method of claim 16, further comprising determining a characteristic of the neutral chemical unit based at least in part on the charging voltage.

18. The method of claim 17, wherein the characteristic includes at least one of an ionization energy, mass, and polarizability of the neutral chemical unit.

19. The method of claim 17, wherein determining the characteristic of the neutral chemical units includes identifying a threshold voltage, and wherein substantially no charged chemical units are detected when the charging voltage is below the threshold voltage.

20. The method of claim 15, further comprising determining the position along the length of the nanostructure at which the charged chemical unit was generated based on at least one of an energy of the detected charged chemical unit and a time at which the charged chemical unit is detected.

21. The method of claim 1, further comprising determining the position along the length of the nanostructure at which the charged chemical unit was generated.

22. The method of claim 21, wherein the position is determined with a resolution of about 1 nm or less.

23. The method of claim 1, further comprising detecting a circumferential position of the nanostructure at which the charged chemical unit was generated.

24. The method of claim 23, wherein detecting the circumferential position includes determining the position with a resolution of about 1 nm or less.

25. The method of claim 1, further comprising exciting the neutral chemical unit to an excited state before ionizing the neutral chemical unit.

26. The method of claim 1, further comprising contacting a first electrode disposed on a substrate with a first end of the nanostructure, wherein a portion of the nanostructure between the first end and a second end of the nanostructure is suspended over a gap in the substrate.

27. An apparatus comprising:

at least one substantially one-dimensional nanostructure;

a substrate;

a first electrode disposed on the substrate and in contact with a first end of the nanostructure, wherein a portion of the nanostructure between the first end and a second end of the nanostructure is suspended over a gap in the substrate, and the nanostructure fully extends across the gap in the substrate;

a voltage source to generate an electric field about the nanostructure by applying a charging voltage between the nanostructure and a reference potential; and a detector to detect a charged chemical unit ejected from the nanostructure upon ionization of a neutral chemical unit captured by the electric field at a position along the length of the nanostructure.

28. The apparatus of claim 27, wherein the at least one substantially one-dimensional nanostructure includes at least one of a single-walled carbon nanotube, a multi-walled carbon nanotube, a nanowire, a nanorod, a nanocylinder, a strip of a sheet of graphene, and an edge of a single sheet of graphene.

29. The apparatus of claim 27, wherein the at least one nanostructure is curved.

30. The apparatus of claim 27, wherein the at least one nanostructure includes a plurality of substantially one-dimensional nanostructures.

31. The apparatus of claim 30, wherein each nanostructure in the plurality of substantially one-dimensional nanostructures has a different radius.

32. The apparatus of claim 30, wherein the voltage source is further configured to apply a different charging voltage to each nanostructure in the plurality of substantially one-dimensional nanostructures.

33. The apparatus of claim 27, wherein the voltage source is further configured to apply a charging voltage of at least about 200 V to the nanostructure.

34. The apparatus of claim 27, wherein the voltage source is further configured to vary the charging voltage as a function of time.

35. The apparatus of claim 27, wherein the voltage source is further configured to vary the charging voltage as a function of angular momentum or ionization potential of the neutral chemical unit.

36. The apparatus of claim 27, further comprising a supplemental voltage source configured to apply a supplemental voltage between the first end of the nanostructure and the second end of the nanostructure.

37. The apparatus of claim 36, further comprising:

a second electrode disposed on the substrate and in contact with the second end of the nanostructure.

38. The apparatus of claim 27, wherein the width of the first electrode is less than about ten times the length of the nanostructure.

39. The apparatus of claim 27, wherein the width of the first electrode is less than about two times the length of the nanostructure.

40. The apparatus of claim 27, wherein the neutral chemical unit includes at least one of an atom, a molecule, and a Bose-Einstein condensate.

41. The apparatus of claim 27, wherein the detector includes at least one of a channel-electron multiplier (CEM), a position-sensitive microchannel plate, a mass spectrometer, an energy spectrometer, and an ion time-stamping equipment.

42. The apparatus of claim 27, further comprising an ion optics element disposed between the nanostructure and the detector.

43. The apparatus of claim 27, further comprising a source to supply the neutral chemical unit with an angular momentum below a capture threshold of the electric field.

44. The apparatus of claim 43, wherein the source includes at least one of a magneto-optical trap, a cold atom source, a thermal vapor, and a thermal beam.

45. The apparatus of claim 43, wherein the source is configured to release a plurality of neutral chemical units, and wherein the detector is configured to detect a number of ions leaving the nanostructure as a function of the charging voltage.

46. The apparatus of claim 27, further comprising a probe laser configured to illuminate the neutral chemical unit before ionization.

47. The apparatus of claim 27, further comprising a laser or electron beam source configured to excite the neutral chemical unit before the neutral chemical unit is captured by the electric field.

48. A method of converting a matter-wave interference pattern to an ionized fringe pattern, the method comprising:

using a beam path, interfering neutral chemical units to generate the matter-wave interference pattern;

using a voltage source, generating an electric field about a substantially one-dimensional nanostructure by applying a charging voltage between the nanostructure and a reference potential;

capturing the matter-wave interference pattern in the electric field about the substantially one-dimensional nanostructure; and ionizing the matter-wave interference pattern along a length of the substantially one-dimensional nanostructure to generate the ionized fringe pattern along the length of the nanostructure.

49. The method of claim 48, further comprising measuring a period of the ionized fringe pattern.

50. The method of claim 49, further comprising determining, based on the ionized fringe pattern, at least one of an angular orientation of the nanostructure, a velocity of the nanostructure, a force applied to the nanostructure, and a potential applied to the nanostructure.

51. The method of claim 48, further comprising magnifying the ionized fringe pattern.

52. The method of claim 48, further comprising measuring a position of at least one fringe in the ionized fringe pattern.

53. An interferometer comprising:

at least one substantially one-dimensional nanostructure;

a voltage source to generate an electric field about the nanostructure by applying a charging voltage between the nanostructure and a reference potential; and a beam path to produce a matter-wave interference pattern disposed within a capture range of the electric field, wherein the matter-wave interference pattern is captured by the electric field along a length of the nanostructure and ionized to produce an ionized fringe pattern along the length of the nanostructure.

54. The interferometer of claim 53, further comprising a detector to sense a period of the ionized fringe pattern.

55. The interferometer of claim 54, wherein the detector is further configured to measure a position of at least one fringe in the ionized fringe pattern.

56. The interferometer of claim 54, wherein the detector is further configured to determine, based on the ionized fringe pattern, at least one of an angular orientation of the interferometer, a velocity of the nanostructure, a force applied to the nanostructure, and a potential applied to the nanostructure.

57. The interferometer of claim 53, further comprising a magnifier configured to magnify the ionized fringe pattern.

58. The interferometer of claim 53, wherein the nanostructure is curved.

* * * * *